US008531287B2

(12) United States Patent
Kim et al.

(10) Patent No.: US 8,531,287 B2
(45) Date of Patent: Sep. 10, 2013

(54) WIRELESS TERMINAL, METHOD FOR OPERATING WIRELESS TERMINAL, AND METHOD FOR OPERATING WIRELESS NETWORK

(75) Inventors: Hyung Jin Kim, Chungcheongnam-do (KR); Seong Chul Cho, Daejeon (KR); Gweon Do Jo, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 463 days.

(21) Appl. No.: 12/860,494

(22) Filed: Aug. 20, 2010

(65) Prior Publication Data

US 2011/0140881 A1    Jun. 16, 2011

(30) Foreign Application Priority Data

Dec. 15, 2009  (KR) .................. 10-2009-0124860

(51) Int. Cl.
*G08B 1/08* (2006.01)
(52) U.S. Cl.
USPC ............... 340/539.13; 340/539.26; 340/670; 340/4.31; 340/7.54; 340/7.55; 340/8.1; 455/404.2; 455/412.1; 455/456.1; 455/457

(58) Field of Classification Search
USPC ............ 340/539.13, 539.26, 670, 4.31, 7.54, 340/7.55, 801, 8.1; 455/404.2, 412.1, 456.1, 455/457
See application file for complete search history.

(56) References Cited

U.S. PATENT DOCUMENTS

| 7,269,413 | B2 * | 9/2007 | Kraft ........................... 455/415 |
| 7,873,366 | B2 * | 1/2011 | Chen ........................ 455/456.1 |
| 2006/0141996 | A1 * | 6/2006 | Huh ........................ 455/414.1 |

FOREIGN PATENT DOCUMENTS

| JP | 2002-44714 | 2/2002 |
| JP | 2002-77977 | 3/2002 |
| JP | 2006-303831 | 11/2006 |
| KR | 2001-0002202 | 6/2001 |
| KR | 10-2005-0115687 | 12/2005 |
| KR | 10-0677355 | 2/2007 |

* cited by examiner

*Primary Examiner* — Tai T Nguyen
(74) *Attorney, Agent, or Firm* — Nelson Mullins Riley & Scarborough LLP (57) ABSTRACT

Provided is a method for operating a wireless terminal. In the method, an event is detected through a user interface. Location information is detected through a wireless channel in response to the event detection. The detected event information and the detected location information are outputted to the user interface.

14 Claims, 7 Drawing Sheets

WIRELESS TERMINAL, METHOD FOR OPERATING WIRELESS TERMINAL, AND METHOD FOR OPERATING WIRELESS NETWORK

CROSS-REFERENCE TO RELATED APPLICATIONS

This U.S. non-provisional patent application claims priority under 35 U.S.C. §119 of Korean Patent Application No. 10-2009-0124860, filed on Dec. 15, 2009, the entire contents of which are hereby incorporated by reference.

BACKGROUND OF THE INVENTION

The present invention disclosed herein relates to wireless communication, and more particularly, to a wireless terminal, a method for operating the wireless terminal, and a method for operating a wireless network.

Personal wireless terminals are being developed with the development of wireless technology. The early personal wireless terminal was implemented by adding a wireless module to a personal electronic device such as a personal computer. Wireless terminals, capable of supporting wireless communication for themselves, and portable wireless terminals are being developed along with the development of wireless communication technology and electronic technology.

SUMMARY OF THE INVENTION

Embodiments of the present invention provide a wireless terminal capable of providing location information corresponding to the occurrence of an event, a method for operating the wireless terminal, and a method for operating a wireless network.

In some embodiments of the present invention, methods for operating a wireless terminal include: detecting an event through a user interface; detecting location information through a wireless channel in response to the event detection; and outputting the detected event information and the detected location information to the user interface.

In some embodiments, the detecting of the event includes detecting a call request or a call reception through the wireless channel.

In other embodiments, the detecting of the event includes detecting at least one of photographing, memo writing, audio recording, video recording, message reception, and message transmission.

In further embodiments, the detecting of the location information through the wireless channel includes detecting the location information from a sync signal received through the wireless channel.

In still further embodiments, the detecting of the location information through the wireless channel includes: transmitting a location information request through the wireless channel; and receiving the location information, corresponding to the location information request, through the wireless channel.

In still further embodiments, if the detected location information changes during the event, the detected location information before the change and the detected location information after the change are outputted to the user interface together with the detected event information.

In still further embodiments, the methods further include storing the detected event information and the detected location information in a nonvolatile memory.

In other embodiments of the present invention, methods for operating a wireless network based on a wireless base station include: detecting an event from a wireless terminal; detecting location information of the wireless terminal through the wireless base station in response to the event detection; and outputting the detected event information and the detected location information through the wireless terminal.

In some embodiments, the detecting of the event from the wireless terminal includes detecting at least one of call request, call reception, photographing, memo writing, audio recording, video recording, message reception, and message transmission by the wireless terminal.

In other embodiments, the detecting of the location information of the wireless terminal through the wireless base station includes detecting the location information transmitted periodically from the wireless base station to the wireless terminal.

In further embodiments, the periodically-transmitted location information is transmitted together with a sync signal that synchronizes the wireless terminal and the wireless base station.

In still further embodiments, the detecting of the location information of the wireless terminal through the wireless base station includes: transmitting a location information request from the wireless terminal to the wireless base station; and transmitting the location information of the wireless terminal from the wireless base station to the wireless terminal in response to the location information request.

In still further embodiments, if there is a change in the wireless base station communicating with the wireless terminal, the detecting of the location information of the wireless terminal through the wireless base station includes detecting the location information through the wireless base station before the change and the wireless base station after the change, respectively.

In still further embodiments, the outputting of the detected event information and the detected location information through the wireless terminal includes outputting the detected event information, the location information detected through the wireless base station before the change, and the location information detected through the wireless base station after the change, through the wireless terminal.

In still further embodiments, the detecting of the location information of the wireless terminal through the wireless base station includes detecting the location information of the wireless base station as the location information of the wireless terminal.

In still further embodiments, the methods further include storing the detected event information and the detected location information in a nonvolatile memory of the wireless terminal.

In further embodiments of the present invention, wireless terminals include: a communication unit configured to support wireless communication; a user interface configured to detect an event; and a control unit configured to acquire location information through the communication unit when an event is detected through the user interface.

In some embodiments, the control unit acquires the location information by decoding a sync signal received through the communication unit.

In other embodiments, the control unit transmits a location information request message through the communication unit and receives the location information, corresponding to the location information request message, through the communication unit.

In further embodiments, the user interface is configured to detect at least one of call request, call reception, photographing, memo writing, audio recording, video recording, message reception, and message transmission as an event.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

Hereinafter, exemplary embodiments of the present invention will be described in detail with reference to the accompanying drawings.

Figure 1:
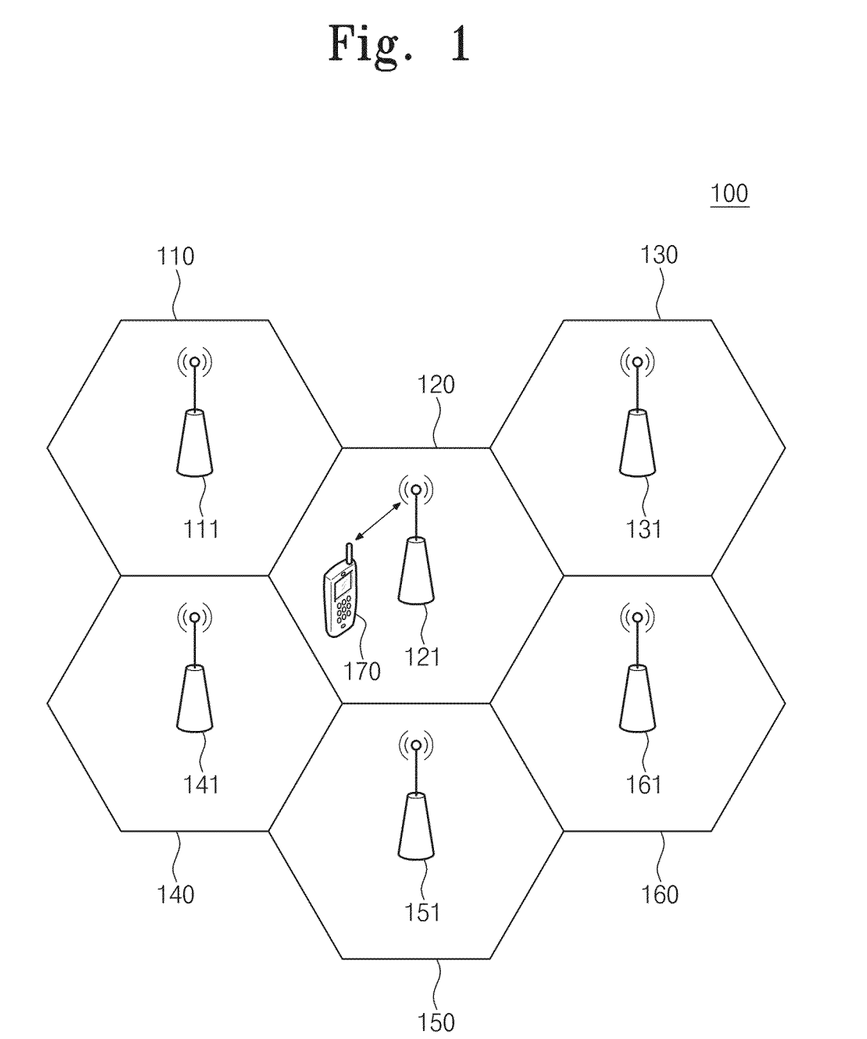
FIG. 1 is a block diagram of a wireless network according to an exemplary embodiment of the present invention.

FIG. 1 is a block diagram of a wireless network 100 according to an exemplary embodiment of the present invention.

Referring to FIG. 1, the wireless network 100 includes first to sixth cells 110 to 160. The first to sixth cells 110 to 160 are based respectively on wireless base stations 111 to 161. For example, the first cell 110 is based on the first wireless base station 111. The first wireless base station 111 provides wireless channels to wireless terminals in the first cell 110. Likewise, the second to sixth wireless base stations 121 to 161 provide wireless channel channels to wireless terminals in the second to sixth cells 120 to 160.

In FIG. 1, a wireless terminal 170 is illustrated as being located in the second cell 120. In this case, the second wireless base station 121 may provide a wireless channel to the wireless terminal 170.

The wireless network 100 is illustrated as including the first to sixth cells 110 to 160. However, the wireless network 100 is not limited to including the first to sixth cells 110 to 160.

The first to sixth cells 110 to 160 of the wireless network 100 are illustrated as having the same area. However, the wireless network 100 is not limited to including cells having the same area. The area of the cell may vary depending on the surrounding environment of the wireless base station and the output power of the wireless base station.

Figure 2:
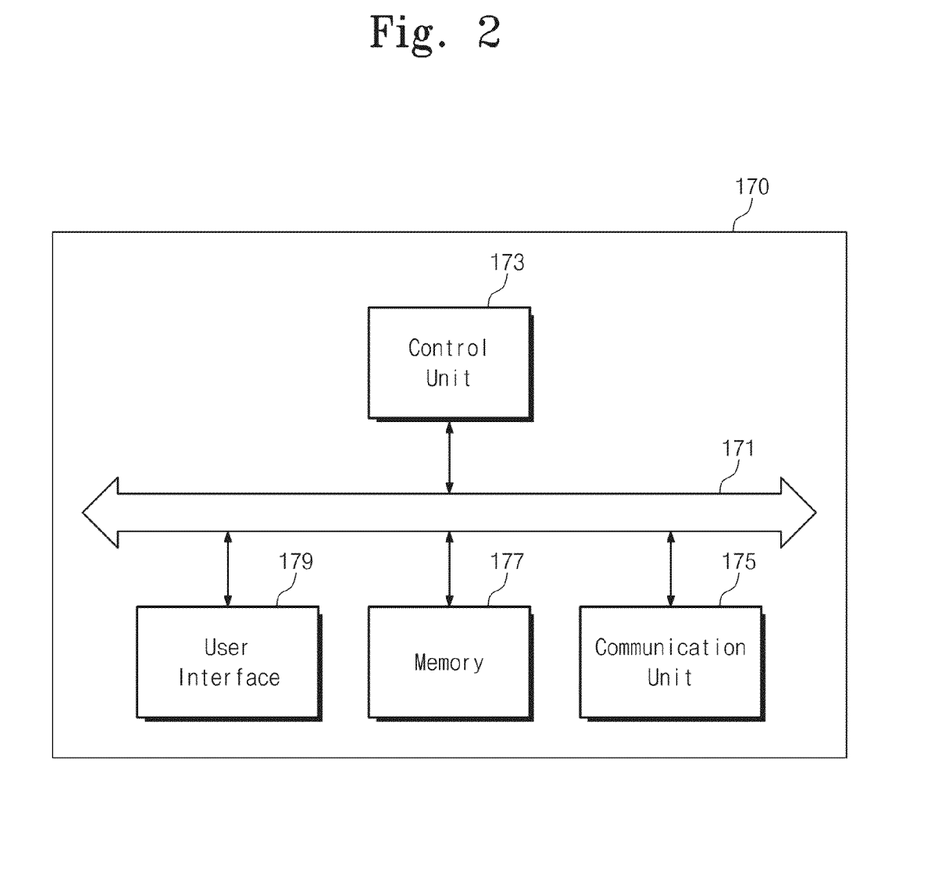
FIG. 2 is a block diagram of a wireless terminal of FIG. 1.

FIG. 2 is a block diagram of the wireless terminal 170 of FIG. 1.

Referring to FIG. 2, the wireless terminal 170 includes an internal bus 171, a control unit 173, a communication unit 175, a memory 177, and a user interface 179.

The internal bus 171 provides channels between the components of the wireless terminal 170.

The control unit 173 is connected to the internal bus 171. The control unit 173 is configured to control an overall operation of the wireless terminal 170. For example, the control unit 173 may drive various software such as firmware, applications, and an operation system (OS) driven in the wireless terminal 170.

The communication unit 175 is connected to the internal bus 171. The communication unit 175 operates in response to the control of the control unit 173. The communication unit 175 provides a communication means for communication with the wireless base station 121 (see FIG. 1). For example, the communication unit 175 may include a transmitter and a receiver. For example, the communication unit 175 may perform communication based on at least one of communication standards such as GSM (Global System for Mobile communications), CDMA (Code Division Multiple Access), CDMA 2000, CDMA 2000 EvDO (Evolution-Data Optimized), WCDMA (Wideband CDMA), WiFi, HSDPA (High-Speed Downlink Packet Access), WiBro, WiMAX, and Eureka-147.

The memory 177 is connected to the internal bus 171. The memory 177 operates in response to the control of the control unit 173. For example, the memory 177 may be a working memory of the wireless terminal 170. The memory 177 may be a buffer memory of the wireless terminal 170. The memory 177 may be a cache memory of the wireless terminal 170. The memory 177 may be a storage memory of the wireless terminal 170.

For example, the memory 177 may be a volatile memory such as SRAM (Static RAM), DRAM (Dynamic RAM), and SDRAM (Synchronous DRAM). For example, the memory 177 may be a nonvolatile memory such as ROM (Read Only Memory), PROM (Programmable ROM), EPROM (Electrically Programmable ROM), EEPROM (Electrically Erasable and Programmable ROM), flash memory, PRAM (Phase-change RAM), MRAM (Magnetic RAM), RRAM (Resistive RAM), and FRAM (Ferroelectric RAM). For example, the memory 177 may include at least one volatile memory and at least one nonvolatile memory.

The user interface 179 is connected to the internal bus 171. The user interface 179 operates in response to the control of the control unit 173. The user interface 179 includes a user input interface receiving signals from the user, and a user output interface outputting signals to the user. For example, the user interface 179 may include user input interfaces such as keypad, keyboard, touchpad, mouse, trackball, microphone, and camera. The user interface 179 may include user output interfaces such as display, speaker, and projector.

Hereinafter, it is assumed that the wireless terminal 170 is a mobile phone. However, the wireless terminal 170 is not limited to a mobile phone. Examples of the wireless terminal 170 include computers, mobile computers, UMPC (Ultra Mobile PC), net-books, PDA (Personal Digital Assistants), portable computers, web tablets, wireless phones, mobile phones, smart phones, e-books, PMP (Portable Multimedia Player), portable game devices, navigation devices, black boxes, digital cameras, DMB (Digital Multimedia Broadcasting) players, digital audio recorders, digital audio players, digital picture recorders, digital picture players, digital video recorders, and digital video players.

Figure 3:
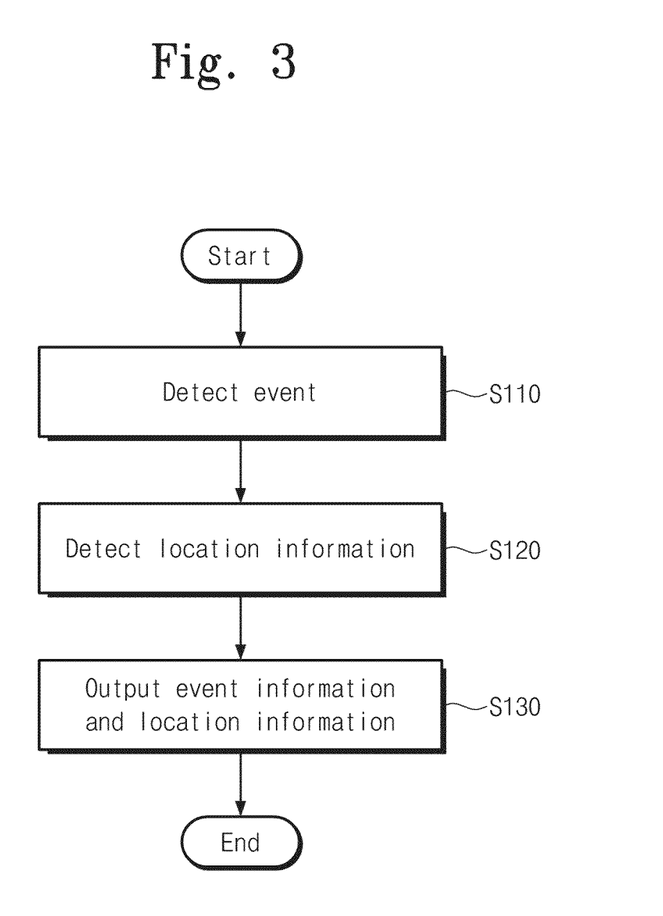
FIG. 3 is a flow chart illustrating an operation of the wireless terminal of FIG. 2.

FIG. 3 is a flow chart illustrating an operation of the wireless terminal 170 of FIG. 2.

Referring to FIGS. 2 and 3, the wireless terminal 170 detects an event in step S110. For example, the event is detected through the user interface 179. For example, the event may be detected when a specific signal is received through the user interface 179 from the user.

For example, the event may be a call request that is detected through the user interface 179. That is, the event may be detected when the user presses a call button of the user interface 179. For example, the event may be call reception that is detected through the user interface 179. That is, the event may be detected when a call is received through the communication unit 175 and the user presses a call button of the user interface 179. That is, when the user makes or receives a call through the user interface 179, the wireless terminal 170 may detect the call request or the call reception as the event.

In step S120, the wireless terminal 170 detects location information. For example, the wireless terminal 170 may detect the location information of the wireless terminal 170. For example, the wireless terminal 170 may detect the location information in response to the detection of the event. For example, the wireless terminal 170 may detect the location information through the wireless channel provided through the communication unit 175. For example, the wireless terminal 170 may detect the location information from the wireless base station 121 (see FIG. 1).

For example, the wireless terminal 170 may detect the location information of the wireless base station 121 as the location information of the wireless terminal 170. Herein, the location information of the wireless terminal 170 may be provided by the cell of the wireless network 100. For example, the location information of the wireless base station 121 may be provided from the wireless base station 121 to the wireless terminal 170.

In step 130, the wireless terminal 170 outputs the event information and the location information. For example, the wireless terminal 170 may output the detected event information (i.e., the call information) through the user interface 179. The wireless terminal 170 may output the detected location information through the user interface 179 together with the detected event information. For example, the call location information may be displayed on a display unit of the user interface 179 together with the call information such as the call time and the phone number of the called party.

If the call information and the call location information are provided through the user interface 179 to the user, the user can utilize the call information on the basis of the call location information, thus increasing the information utility of the wireless terminal 170. For example, it is assumed that the user detects the call time and the phone number of the called party from the call information and detects 'Gajeongro, Yuseong-gu, Daejeon, Korea' from the call location information. On the basis of the call location information, the user can recognize that he has called the called party on 'Gajeongro, Yuseong-gu, Daejeon, Korea'. Since the location information is provided in addition to information about the call time and the called party, the user can easily recall a memory for the contents of the call.

For example, step S130 may be performed after the termination of the event. That is, the detected event information and the detected location information may be outputted through the user interface 179 after the termination of the detected event. For example, the call information and the call location information may be displayed on the display unit of the user interface 179 after the completion of the call.

For example, the detected event information and the detected location information may be stored in the nonvolatile memory 177.

For example, it has been described that the wireless terminal 170 detects the call request and the call reception as the event. However, the event is not limited to the call request and the call reception. For example, the wireless terminal 170 may detect at least one of operations, such as photographing, message transmission/reception, audio recording, video recording, and memo writing, as the event. Thus, the location information corresponding to the photographing event, the location information corresponding to the message transmission/reception event, the location information corresponding to the audio recording event, the location information corresponding to the video recording event, and/or the location information corresponding to the memo writing event may be provided to the user.

Figure 4:
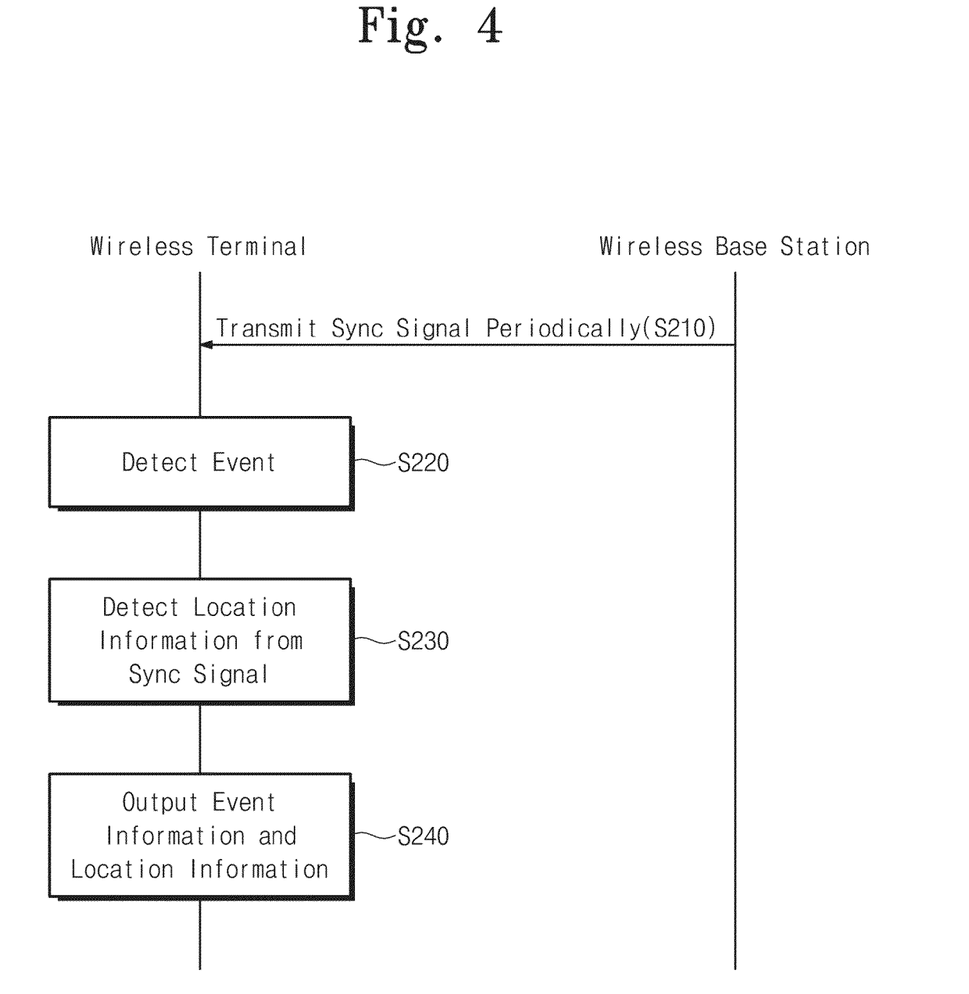
FIG. 4 is a flow diagram illustrating the detection of location information in the wireless network of FIG. 1 according to an exemplary embodiment of the present invention.

FIG. 4 is a flow diagram illustrating the detection of location information in the wireless network 100 of FIG. 1 according to an exemplary embodiment of the present invention.

Referring to FIGS. 1 and 4, the wireless base station 121 periodically transmits a sync signal to the wireless terminal 170 in step S210. The sync signal may be to synchronize the wireless terminal 170 and the wireless base station 121. For example, the periodic sync signal may include location information. For example, the periodic sync signal may include the location information of the wireless base station 120. For example, the location information may be transmitted together with the periodic sync signal.

In step S220, the wireless terminal 170 detects an event. As described with reference to FIG. 3, the wireless terminal 170 may detect the event through the user interface 179. For example, the wireless terminal 170 may detects at least one of operations, such as call request, call reception, message transmission, message reception, photographing, video recording, audio recording and memo writing, as the event.

In step S230, the wireless terminal 170 detects the location information from the sync signal. The wireless terminal 170 may detects the location information of the wireless terminal 170 from the sync signal. For example, the wireless terminal 170 may decode the location information from the periodic sync signal. That is, the wireless terminal 170 may periodically update the location information. Also, in response to the event detection, the wireless terminal 170 may detect the location information corresponding to the event detection time.

For example, the wireless terminal 170 may discard the location information corresponding to the periodic sync signal. In response to the event detection, the wireless terminal 170 may decode the location information from the periodic sync signal. That is, the wireless terminal 170 may detect the location information in response to the event detection.

In step S240, the wireless terminal 170 outputs the detected event information and the detected location information. Step S240 may be performed in the same way as described with reference to step S130 of FIG. 3.

Figure 5:
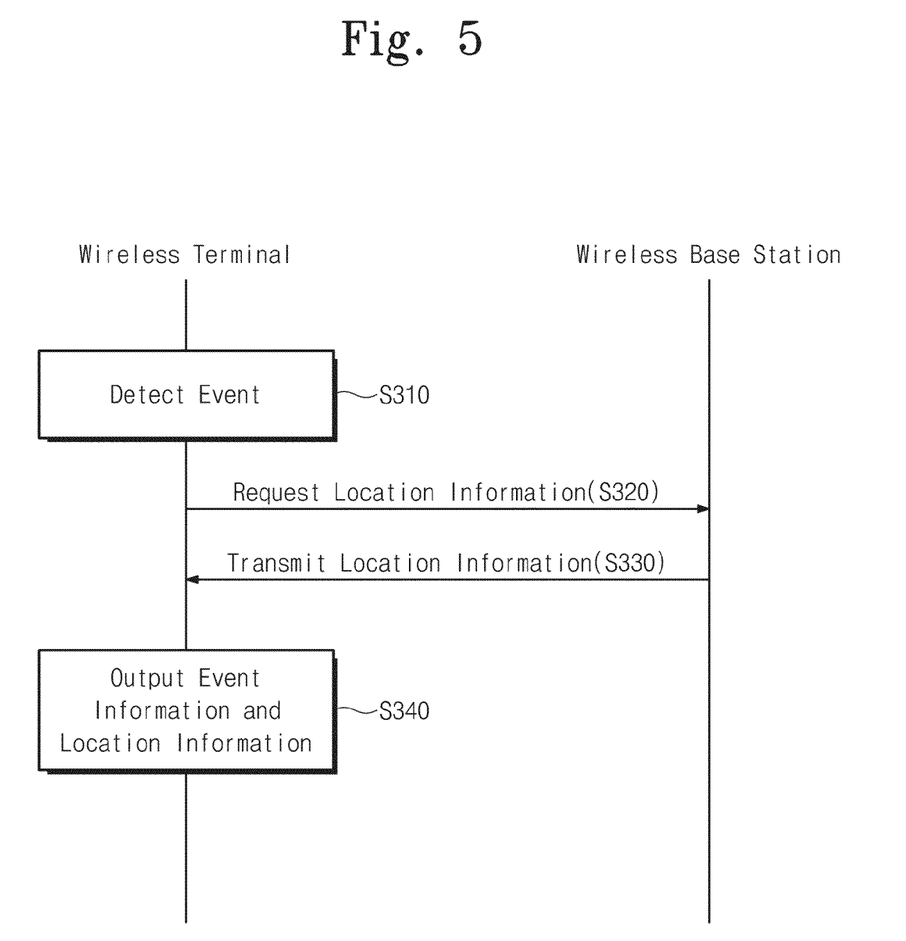
FIG. 5 is a flow diagram illustrating the detection of location information in the wireless network of FIG. 1 according to another exemplary embodiment of the present invention.

FIG. 5 is a flow diagram illustrating the detection of location information in the wireless network 100 of FIG. 1 according to another exemplary embodiment of the present invention.

Referring to FIGS. 1 and 5, the wireless terminal 170 detects an event in step S310. Step S310 may be performed in the same way as described with reference to step S110 of FIG. 3.

In step S320, the wireless terminal 170 requests location information from the wireless base station 121. In step S330, the wireless base station 121 transmits the location information to the wireless terminal 170 in response to the location information request received from the wireless terminal 170. For example, the location information may be the location information of the wireless base station 121.

In step 340, the wireless terminal 170 outputs the detected event information and the detected location information through the user interface 179. Step S340 may be performed in the same way as described with reference to step S130 of FIG. 3.

As described above, when detecting the event, the wireless terminal 170 provides the user with the event information and the location information of the wireless terminal 170 corresponding to the event detection time, thus increasing the event information utility.

As described above, the location information is provided through a wireless channel from the wireless base station 121. Thus, there is no need for an additional resource for acquiring the location information by the wireless terminal 170.

Also, the location information of the wireless base station 121 is provided to the wireless terminal 170. The wireless terminal 170 uses the location information, received from the wireless base station 121, as the location information of the wireless terminal 170. Since the wireless base station 121 is stationary, the location information is also fixed. Thus, there is no additional load for acquiring or calculating the location information by the wireless terminal 170 and the wireless base station 121.

Figure 6:
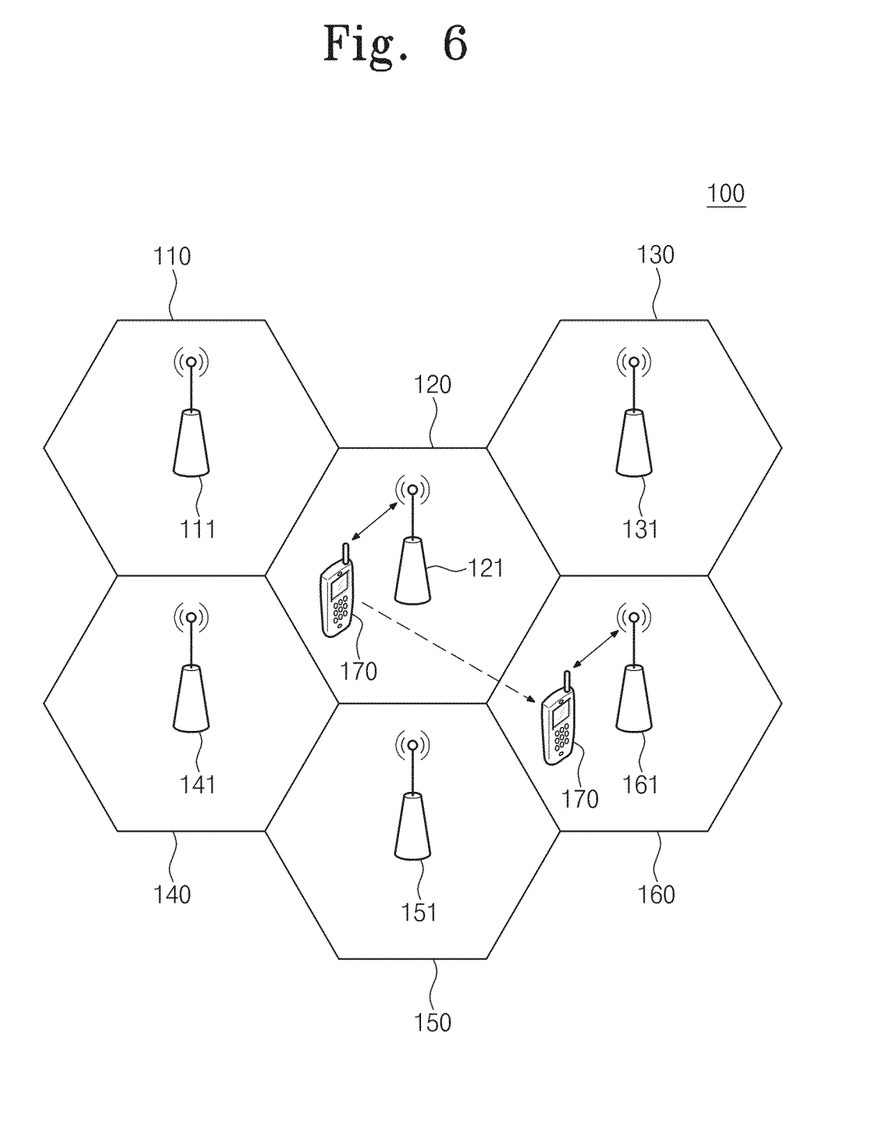
FIG. 6 is a block diagram illustrating a handover of the wireless terminal in the wireless network of FIG. 1.

FIG. 6 is a block diagram illustrating a handover of the wireless terminal 170 in the wireless network 100 of FIG. 1.

Referring to FIG. 6, the wireless terminal 170 moves from the second cell 120 to the sixth cell 160. That is, the wireless terminal 170 communicates with the second wireless base station 121 before the movement, and communicates with the sixth wireless base station 161 after the movement.

For example, it is assumed that an event occurs when the wireless terminal 170 communicates with the second wireless base station 121, and the event terminates when the wireless terminal 170 communicates with the sixth wireless base station 161. That is, it is assumed that the wireless terminal 170 moves from the second cell 120 to the sixth cell 160 during the event.

The location information of the wireless terminal 170 at the occurrence of the event corresponds to the second wireless base station 121, and the location information of the wireless terminal 170 at the termination of the event corresponds to the sixth wireless base station 161. When there is a change in the communicating wireless base station (i.e., a change in the location information) during the event, the wireless terminal 170 detects/provides the location information before/after the change.

Figure 7:
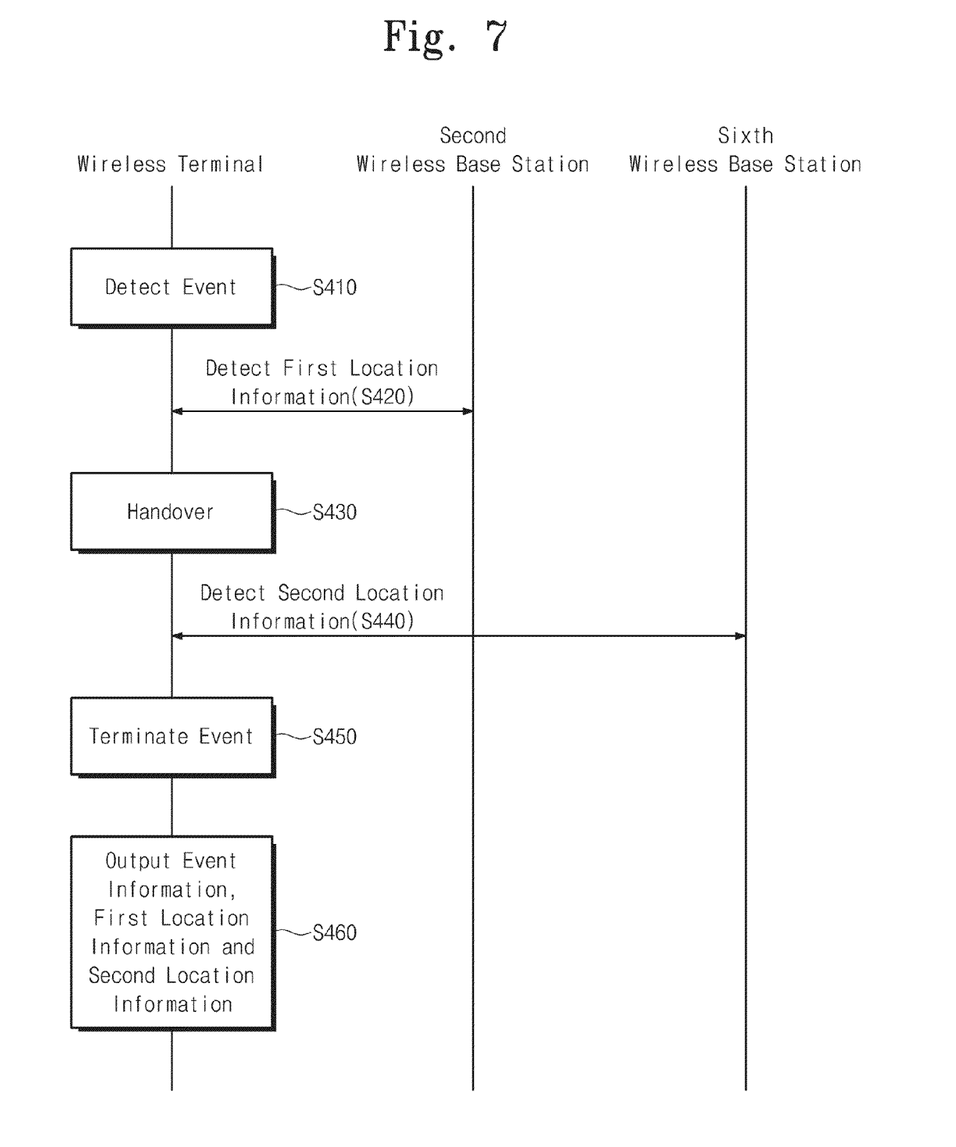
FIG. 7 is a flow diagram illustrating an operation of the wireless network of FIG. 6.

FIG. 7 is a flow diagram illustrating an operation of the wireless network 100 of FIG. 6.

Referring to FIG. 7, the wireless terminal 170 detects an event through the user interface 179 in step S410. Step S410 may be performed in the same way as described with reference to step S110 of FIG. 3.

In step S420, the wireless terminal 170 detects first location information. Since the wireless terminal 170 is located in the second cell 120 corresponding to the second wireless base station 121, the wireless terminal 170 detects the first location information through the second wireless base station 121. For example, the wireless terminal 170 may detect the location information of the second wireless base station 121 as the first location information. For example, the first location information may be detected in the same way as described with reference to FIG. 4 or FIG. 5.

In step S430, a handover occurs. That is, the wireless terminal 170 moves from the second cell 120 to the sixth cell 160. In step S440, the wireless terminal 170 detects second location information through communication with the sixth wireless base station 161 after the movement. For example, the wireless terminal 170 may detect the location information of the sixth wireless base station 160 as the second location information. For example, the second location information may be detected in the same way as described with reference to FIG. 4 or FIG. 5.

In step S450, the event terminates. In step S460, the wireless terminal 170 outputs the first location information and the second location information through the user interface 179 together with the event information. When there is a change in the location information of the wireless terminal 170 (i.e., a change in the wireless base station) during the event, the wireless terminal 170 detects/provides the first location information before the change and the second location information after the change. Thus, the location movement information of the wireless terminal 170 during the event can be provided to the user.

It has been described with reference to FIGS. 6 and 7 that the wireless terminal 170 detects/provides the first location information corresponding to the second wireless base station 121 and the second location information corresponding to the sixth wireless base station 161. However, the wireless terminal 170 is not limited to detecting/providing two pieces of location information. For example, if the wireless terminal 170 moves through 'n' cells during the event, the wireless terminal 170 may detect/provide 'n' pieces of location information corresponding respectively to the 'n' cells.

As described above, the present invention provides location information through the wireless base station in response to the occurrence of an event, thus making it possible to provide a service of linking an event with location information.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for operating a wireless terminal, comprising:
   detecting an event through a user interface;
   detecting location information through a wireless channel in response to the event detection; and
   outputting the detected event information and the detected location information to the user interface,
   wherein if the detected location information changes during the event, the detected location information before the change and the detected location information after the change are outputted to the user interface together with the detected event information.

2. The method of claim 1, wherein the detecting of the event comprises detecting a call request or a call reception through the wireless channel.

3. The method of claim 1, wherein the detecting of the event comprises detecting at least one of photographing, memo writing, audio recording, video recording, message reception, and message transmission.

4. The method of claim 1, wherein the detecting of the location information through the wireless channel comprises detecting the location information from a sync signal received through the wireless channel.

5. The method of claim 1, wherein the detecting of the location information through the wireless channel comprises:
   transmitting a location information request through the wireless channel; and
   receiving the location information, corresponding to the location information request, through the wireless channel.

6. The method of claim 1, further comprising storing the detected event information and the detected location information in a nonvolatile memory.

7. A method for operating a wireless network based on a wireless base station, comprising:
   detecting an event from a wireless terminal;
   detecting location information of the wireless terminal through the wireless base station in response to the event detection; and
   outputting the detected event information and the detected location information through the wireless terminal,
   wherein if there is a change in the wireless base station communicating with the wireless terminal, the detecting of the location information of the wireless terminal through the wireless base station comprises detecting the location information through the wireless base station before the change and the wireless base station after the change, respectively.

8. The method of claim 7, wherein the detecting of the event from the wireless terminal comprises detecting at least one of call request, call reception, photographing, memo writing, audio recording, video recording, message reception, and message transmission by the wireless terminal.

9. The method of claim 7, wherein the detecting of the location information of the wireless terminal through the wireless base station comprises detecting the location information transmitted periodically from the wireless base station to the wireless terminal.

10. The method of claim 9, wherein the periodically-transmitted location information is transmitted together with a sync signal that synchronizes the wireless terminal and the wireless base station.

11. The method of claim 7, wherein the detecting of the location information of the wireless terminal through the wireless base station comprises:
   transmitting a location information request from the wireless terminal to the wireless base station; and
   transmitting the location information of the wireless terminal from the wireless base station to the wireless terminal in response to the location information request.

12. The method of claim 7, wherein the outputting of the detected event information and the detected location information through the wireless terminal comprises outputting the detected event information, the location information detected through the wireless base station before the change, and the location information detected through the wireless base station after the change, through the wireless terminal.

13. The method of claim 7, wherein the detecting of the location information of the wireless terminal through the wireless base station comprises detecting the location information of the wireless base station as the location information of the wireless terminal.

14. The method of claim 7, further comprising storing the detected event information and the detected location information in a nonvolatile memory of the wireless terminal.

\* \* \* \* \*